United States Patent
Skinner et al.

[15] 3,706,439
[45] Dec. 19, 1972

[54] MOTION PICTURE VIEWER WITH REMOVABLE CARTRIDGE

[72] Inventors: James R. Skinner, Cupertino; Mark O. Uitz, Mountain View; Paul W. Hait, Saratoga, all of Calif.

[73] Assignee: Action Film, Inc., Mountain View, Calif.

[22] Filed: Oct. 17, 1969

[21] Appl. No.: 867,289

[52] U.S. Cl. .....................352/78, 352/129, 352/184
[51] Int. Cl. ..........................G03b 23/04, G03b 1/16
[58] Field of Search..................352/72, 78, 129, 184; 242/55.19 A, 194, 197–200

[56] References Cited

UNITED STATES PATENTS

| | | | |
|---|---|---|---|
| 3,264,051 | 8/1966 | Melton | 352/173 |
| 3,399,944 | 9/1968 | Kuhn | 352/72 |
| 1,372,675 | 3/1921 | Davis | 352/72 |
| 2,122,804 | 7/1938 | Tichnor | 352/129 |
| 2,241,231 | 5/1941 | Witlel | 352/72 |
| 2,675,735 | 4/1954 | Gentilini | 352/184 |
| 3,176,310 | 4/1965 | Finnerty | 352/72 |
| 3,265,457 | 8/1966 | Dale | 352/129 |

FOREIGN PATENTS OR APPLICATIONS

| | | | |
|---|---|---|---|
| 1,163,159 | 4/1958 | France | 352/129 |
| 426,239 | 3/1935 | Great Britain | 352/184 |

*Primary Examiner*—S. Clement Swisher
*Attorney*—Flehr, Hohbach, Test, Albritton & Herbert

[57] ABSTRACT

Motion picture apparatus with removable cartridge having a housing with a cartridge removably mounted in the housing. An aperture is provided in the cartridge. A length of film is disposed within the cartridge and means is provided for advancing the length of film frame by frame past the aperture. Means is mounted in the cartridge and exposed to ambient light for supplying light to the film on the side of the film opposite the aperture. An optical assembly is mounted on the housing in front of the aperture for forming an image of the film as it is advanced in the cartridge.

14 Claims, 16 Drawing Figures

PATENTED DEC 19 1972

INVENTOR.
JAMES R. SKINNER
MARK O. UITZ
PAUL W. HAIT
BY
Flehr, Hohbach, Test,
Albritton & Herbert
ATTORNEYS

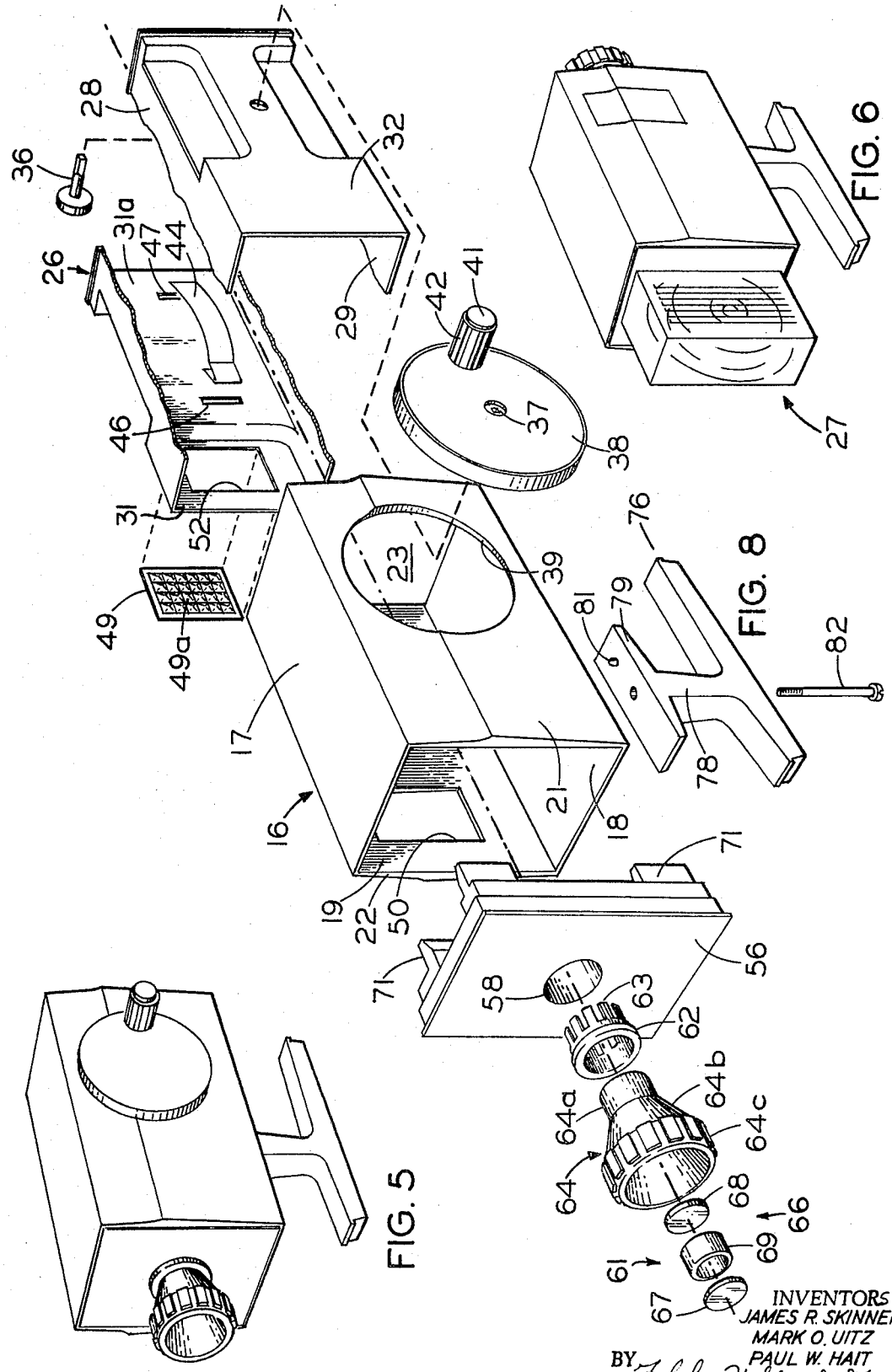

PATENTED DEC 19 1972
3,706,439
SHEET 3 OF 4
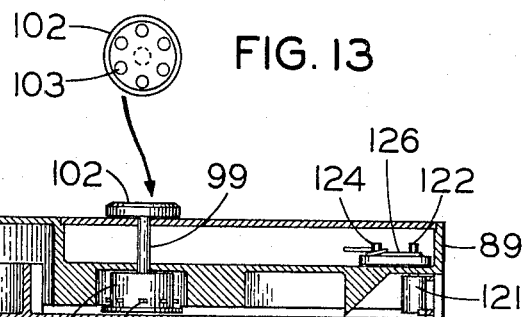
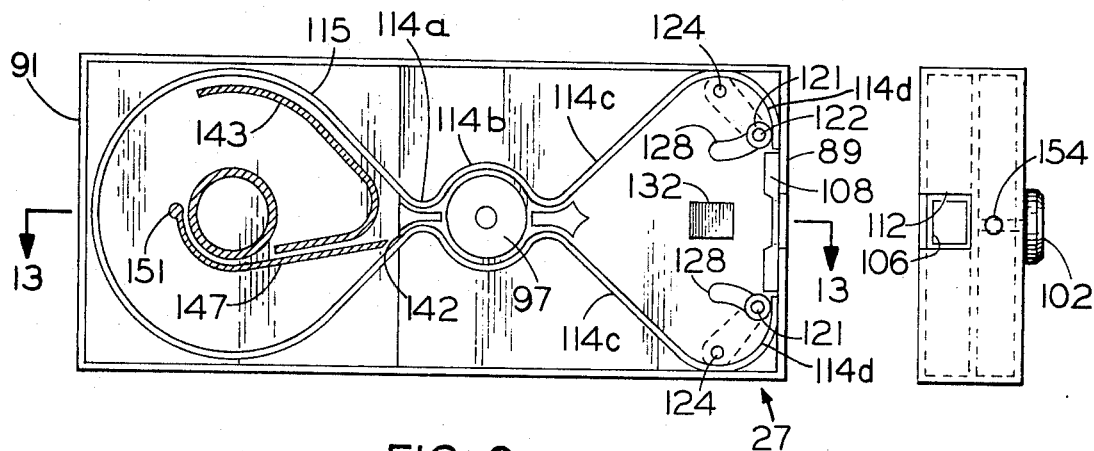
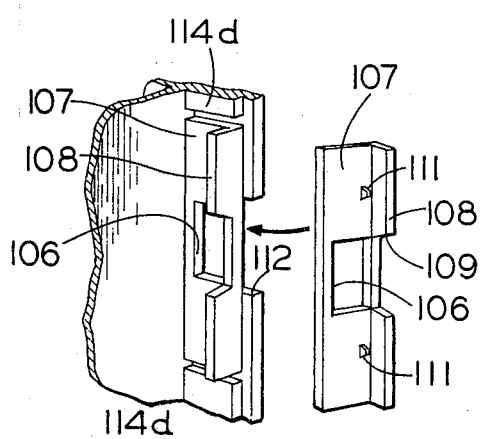
INVENTOR
JAMES R. SKINNER
MARK O. UITZ
PAUL W. HAIT
BY Flehr, Hohbach, Test,
Albritton & Herbert
ATTORNEYS

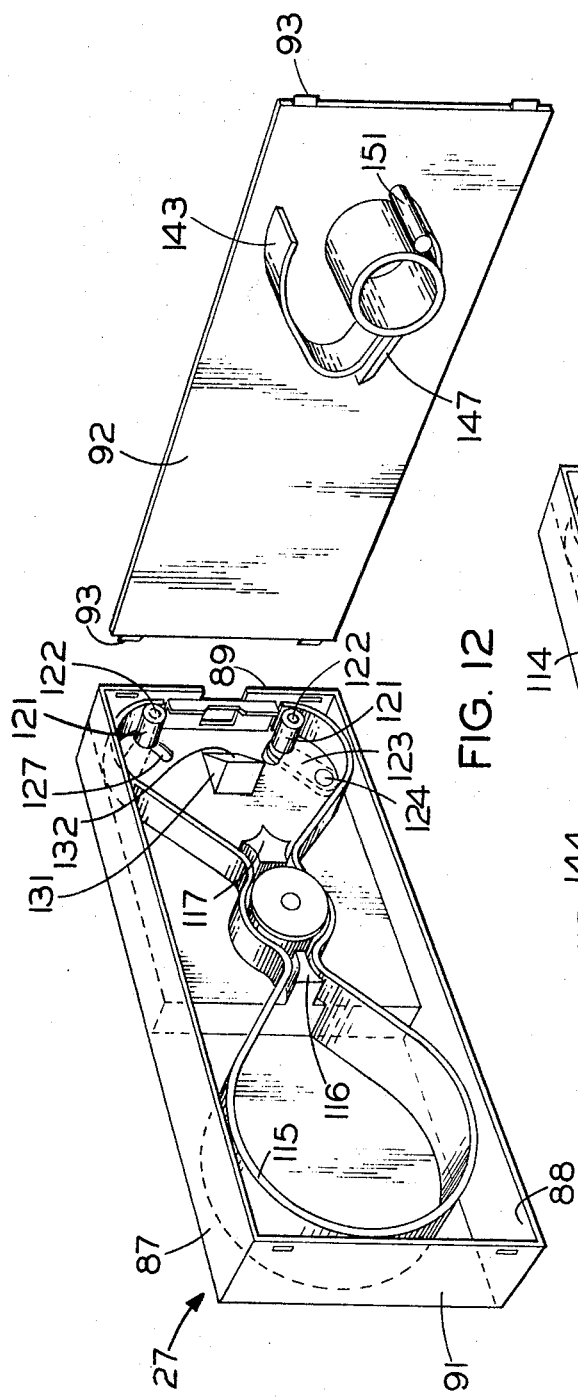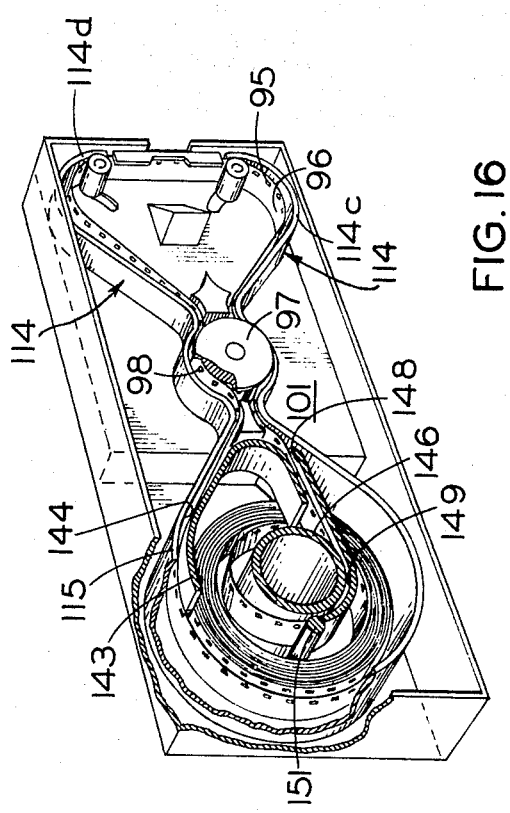

MOTION PICTURE VIEWER WITH REMOVABLE CARTRIDGE

BACKGROUND OF THE INVENTION

Hand-held manually operated motion picture viewers have heretofore been provided. However, such viewers have had a number of disadvantages. For example, they have been noisy in operation. They have been unreliable in operation and, in addition, they have been relatively expensive to produce. There is, therefore, a need for a new and improved motion picture viewer which will overcome the above named disadvantages.

SUMMARY OF THE INVENTION AND OBJECTS

The motion picture apparatus consists of a housing. A cartridge is removably mounted in the housing. The cartridge is formed with an aperture. A length of film is disposed in the cartridge and means is provided for advancing the film frame by frame past the aperture. Means is mounted in the aperture and exposed to ambient light for supplying light to the film on the side opposite the aperture. An optical assembly is mounted in the housing in front of the aperture in the cartridge for forming an image of the film as it is advanced. The means for advancing the film is formed so that the film can be advanced in either of two directions.

In general, it is an object of the present invention to provide a motion picture apparatus with a removable cartridge which can be inexpensively produced.

Another object of the invention is to provide a motion picture apparatus with removable cartridge of the above type which is relatively quiet in operation.

Another object of the invention is to provide a motion picture apparatus with removable cartridge in which the viewer can be held by one hand and operated by the other hand and still provide good motion pictures.

Another object of the invention is to provide a motion picture apparatus with removable cartridge of the above character which utilizes ambient light.

Additional objects and features of the invention will appear from the following description in which the preferred embodiment is set forth in detail in conjunction with the accompanying drawing.

BRIEF DESCRIPTION OF THE DRAWING

FIG. 5 is a perspective view of the motion picture viewer.

FIG. 6 is another perspective view of the motion picture viewer shown with the removable cartridge in place.

FIG. 8 is an exploded view of the motion picture viewer.

FIG. 9 is a side elevational view of a cartridge incorporating the present invention.

FIG. 10 is a top plan view of the cartridge shown in FIG. 9.

FIG. 11 is a front elevational view of the cartridge shown in FIG. 9.

FIG. 12 is a perspective view showing the cartridge with the front cover in an open position.

FIG. 13 is a side elevational view of the driven member used in the cartridge.

FIG. 14 is a partial perspective view of the front end of the cartridge.

FIG. 15 is a perspective view of the film guide member shown in FIG. 14.

FIG. 16 is a perspective view of the cartridge with movie film in place.

DESCRIPTION OF THE PREFERRED EMBODIMENT

Figure 1:
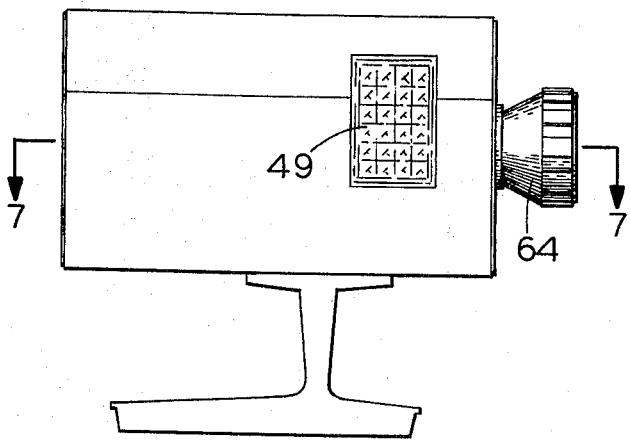
FIG. 1 is a side elevational view of a motion picture viewer incorporating the present invention.
Figure 3:
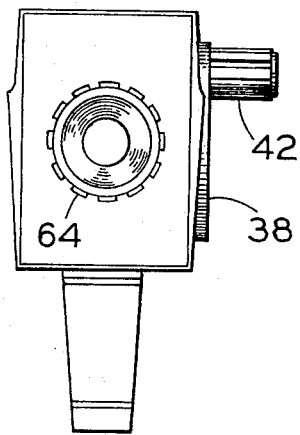
FIG. 3 is a front elevational view of the motion picture viewer.
Figure 2:
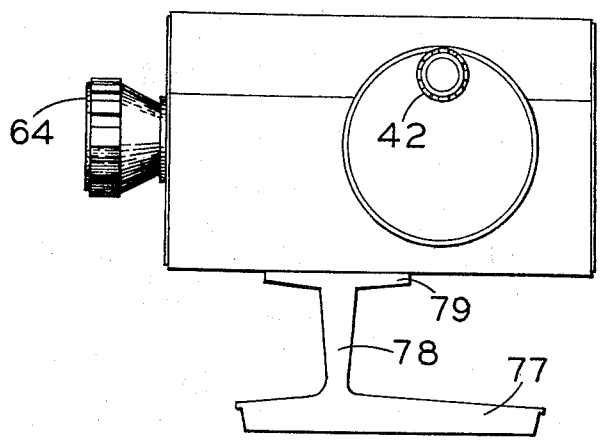
FIG. 2 is a side elevational view of the motion picture viewer opposite the side shown in FIG. 1.
Figure 4:
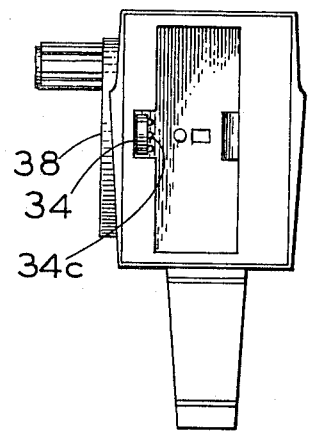
FIG. 4 is a rear elevational view of the motion picture viewer.
Figure 7:
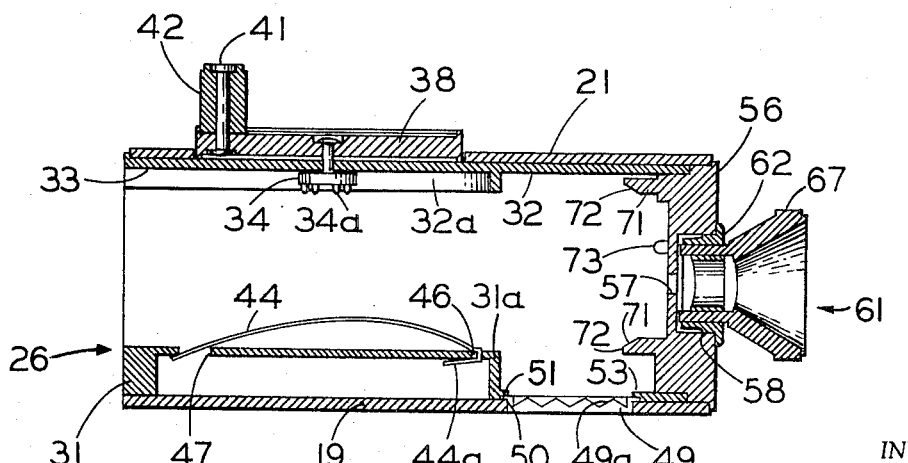
FIG. 7 is a cross-sectional view taken along the line 7—7 of FIG. 1.

The motion picture apparatus is in the form of a motion picture viewer consisting of a housing 16 which is generally rectangular in shape as shown in FIGS. 1-8. The housing 16 is formed of suitable material such as an aluminum extrusion. The housing consists of top and bottom walls 17 and 18, side walls 19 and 21, and front and rear open ends 22 and 23. A one-piece inner case 26 formed of a suitable material such as plastic is disposed within the housing 16. The inner case 26 is adapted to receive a film magazine or cartridge 27 hereinafter described in detail. The inner case is provided with a top wall 28, a bottom wall 29 and side walls 31 and 32. The side wall 31 is provided with an inwardly extending raised portion 31a (see FIGS. 7 and 8) which extends longitudinally of the inner case 26. The side wall 32 is provided with inwardly extending upper and lower portions 32a between which there is formed a longitudinally extending recess 33.

A disc-like drive member 34 is disposed within the recess 33 and is provided with integral, outwardly extending drive lugs or pins 34a which are spaced in a circle adjacent the outer margin of one side of the drive member 34. The drive member 34 is provided with an integral shaft 36 which is squared on its outermost end. The shaft 36 extends through the side wall 32 of the inner case 26 and extends into a square hole 37 provided in a crank disc 38. The disc 38 is disposed within a circular opening or hole 39 provided in the housing 16. A pin 41 is mounted adjacent the outer margin of the wheel 38 and extends outwardly therefrom. A sleeve 42 is mounted on the pin. It can be seen that the sleeve 42 and the pin 41 serve as a handle which, in combination with the disc 38, serve as crank means for rotating the drive member 34.

Spring means is provided for yieldably engaging the film cartridge or magazine 27 and urging it into engagement with the drive member 34 and consists of a metal leaf spring 44 which has one end portion 44a turned over to form a clip which extends through a hole 46 provided in the side wall 31. The other end of the leaf spring 44 extends through a wide opening 47 provided in the side wall 31.

A diffuser window 49 for admitting ambient light is formed of a suitable material such as plastic and is mounted in an opening 50 in side wall 22 of the housing 16. The window 49 is provided with a plurality of prism portions 49a of a type well known to those skilled in the art. The diffuser window 49 is provided with flanges 51 which extend over the side wall 22 and serve to prevent the window from falling outwardly through the opening 50. The window 49 is also in registration with an opening 52 in the side wall 31 of the inner case 26. The rear sides of the flanges 51 of the window 49 are engaged by flanges 53 provided on the inner case 26 (see FIG. 7).

A front mounting plate 56 is mounted in the front opening 22 of the housing 16. The front mounting plate is formed of a suitable material such as plastic and is provided with a viewing aperture 57 which opens into a cylindrical bore 58 also provided in the front mounting plate. An eye piece assembly 61 is mounted in the bore 58. The eye piece assembly 61 consists of a ring 62 which is provided with a plurality of spaced fingers which are adapted to frictionally engage the annular surface forming the bore 58. The ring 62 is adapted to receive a cylindrical portion 64a of an eye piece 64. A lens assembly 66 is mounted in the cylindrical portion 64a. The lens assembly consists of a pair of plano convex plastic lenses 67 and 68 which are separated by a spacer 69. The eye piece 64 is provided with a cone-shaped portion 64b and a knurled cylindrical portion 64c. By positioning the eye piece 64 within the ring 62, it is possible to focus the eye piece assembly 61 relative to the film to be viewed as hereinafter described.

The front mounting plate 56 is provided with integral spaced ears 71. As can be seen particularly from FIGS. 7 and 8, two pairs of ears are spaced on opposite sides of the aperture 57 and are also spaced at the top and bottom of the mounting plate. The ears 71 are provided with inclined surfaces 72 which facilitate positioning of the magazine or cartridge 27. In addition, a locating pin 73 is mounted on the mounting plate adjacent the aperture 57 and is adapted to be engaged by the magazine or cartridge 27 to precisely position the same.

In assembling the viewer, the inner case 26 is slipped into the rear open end 23 of the housing 16 and the mounting plate 56 is pressed into the front open end 22 of the housing 16. The inner case 26 and the mounting plate 56 then can be fastened together in a suitable manner such as by the use of cement so that they are retained within the housing.

A combination stand and hand grip 76 is mounted upon the housing 16 and is provided with an elongate base 77, a vertical pedestal 78 and a mounting block 79 which is secured to the pedestal. The stand 76 can be formed of a suitable material such as an aluminum extrusion. A locating pin 81 is provided in the mounting block 79 and is adapted to engage a hole (not shown) in the housing 16. A screw 82 which is countersunk in and extends through the stand is threaded into the housing 16.

The film cartridge or magazine 27 is formed of a suitable material such as plastic and is provided with a rear side wall 86, top and bottom walls 87 and 88, and front and rear end walls 89 and 91. A front cover 92 is provided and has ears 93 at one end which are adapted to seat within slots 94 provided in the front wall 89. Ears 93 are also provided on the other end of the front cover and are adapted to engage slots (not shown) in the rear wall 91 similar to the slots 94.

A length of film 96 is disposed within the cartridge 27. In the embodiment of the cartridge shown, the length of film 96 takes the form of a continuous loop. However, it should be appreciated that the principles of the present invention can be utilized in conjunction with a non-continuous loop with the use of separate supply and take-up reels. The length of film 96 is of a conventional type and is provided with a plurality of perforations 95 extending longitudinally of the film along one side of the film. The film 96 is adapted to be engaged by a sprocket 97. The sprocket 97 is provided with teeth 98 which are adapted to engage the perforations 95 in the film. The sprocket 97 is mounted on a shaft 99 which is mounted in a wall 101 parallel to the rear wall 86 and spaced therefrom. The shaft 99 also extends through the wall 86 and has secured thereto a driven circular disc 102. The driven disc 102 is provided with a plurality of recesses 103 spaced in a circle and adjacent the outer margin of the outer surface of the driven circular disc 102.

The film 96 is to be moved past an aperture 106 provided in an index plate 107 which is secured to the front wall 89 of the cartridge by suitable means such as cement. The index plate 107 is provided with a rearwardly extending film guide or flange 108 which is adapted to guide one edge of the film as it passes the aperture. The guide flange 108 is provided with a slot 109 in alignment with the aperture 106. Means is provided for arresting the film during its travel past the aperture and consists of a pair of triangularly shaped pins 111 mounted above and below the aperture 106 adjacent the guide flange 108. The aperture 106 is positioned so that it will be in registration with the aperture 57 provided in the front mounting plate of the housing 16 when the cartridge is inserted in the housing. The front wall 89 is also provided with an opening 112 which is slightly larger than the aperture 106 and in general registration with the aperture.

Upper and lower film guide members 114 are provided. The guide members 114 are formed integral with a generally circular film storage guide member 115. These guide members 114 and 115 are secured to the wall 101. At the entrance to the sprocket 97, the film guide members 114 are provided with outwardly turned portions 114a between which there is provided a separator 116 which can be designated as the rear separator because it is positioned immediately adjacent the sprocket 97 to the rear of the same. The film guide members 114 are also provided with curved portions 114b which are adapted to lie in relatively close proximity to the upper and bottom sides of the sprocket 97. The film guide members 114 are also provided with outwardly extending portions 114c and downwardly extending portions 114d. The portions 114d terminate immediately adjacent the upper and lower extremities of the index plate 107. A front separator 117 is provided between the film guide members 114 for keeping the upper and lower runs of the film separate.

Means is provided for retaining the film 96 in relatively close proximity to the index plate and the aperture 106 of the index plate and consists of a pair of rollers 121 positioned above and below the index plate. The rollers 121 are mounted upon pins 122 carried by arms 123. The arms 123 are pivotally mounted on pins 124 secured to the plate 101. Springs 126 have one end engaging the pin 122 and the other end engaging the pin 124 and yieldably urge the rollers into engagement with the film 96. As can be seen, particularly from FIG. 12, the pins 122 extend through arcuate slots 128 provided in the side wall 101.

Means is provided for utilizing light admitted into the motion picture viewer by the window 49 and carrying it to a point immediately behind the film in the aperture. This means consists of a triangular block 131 which is secured to the wall 101. A reflecting surface 132 is provided on the triangular block 131. The surface 132 generally extends at an angle of 45° with respect to the film and to the window 49.

The storage guide member 115 cooperates with film guiding means carried by one end of the front cover 92. This film guiding means takes the form of a generally J-shaped guide member 143 which has the bottom of the J facing through an opening 142 provided in the circular guide member 115. This J-shaped member in cooperation with the guide member 115 forms an elongate slot 144 through which the film travels after it is separated from the outside of the roll of film loosely wound on a central fixed spool or cylinder 146 mounted on the cover 92. In addition, there is provided an elongate guide member 147 which is positioned adjacent the end of the guide member 143 and cooperates with the guide member 143 to provide a slot 148 for travel of the film 96. The guide member 147 is curved at its innermost end and forms in cooperation with the cylinder 146 an arcuate slot 149 through which the film 96 passes to be wound or unwound from the center of the roll of film. The curved end of the guide member 147 is mounted on a cylindrical pin 151 mounted on the cover 92.

A hole 154 is provided in the front wall 89 of the cartridge which is adapted to receive the registration pin 73 provided on the mounting plate 56.

Operation and use of the motion picture viewer with a removable cartridge or magazine may now be briefly described as follows. Let it be assumed that a continuous length of film 96 has been mounted within the cartridge in which most of the film is in the roll. The film 96 is positioned as shown in FIG. 16 and can be payed off from either the outside or the inside of the roll. The film 96 is also threaded over and under the sprocket 97 and is positioned behind the rollers 121 against the index plate 107 so that the film is in position for viewing through the viewing aperture. After the film 96 has been properly threaded, the cover 92 can be closed.

After the magazine or cartridge 27 has been loaded, it can be readily loaded into the motion picture viewer merely by inserting it through the back opening of the viewer. The cartridge is precisely positioned in the viewer by the ears 72 and finally by the locating pin 73. The locating pin 73 enters the hole 146 to precisely position the magazine or cartridge 27 so that the aperture 106 is in registration with the aperture 57 provided in the mounting plate 56 secured to the housing 16.

At the same time that the magazine is being pushed in place, the drive member 34 carried by the viewer and the driven member 102 carried by the magazine are automatically moved into registration with each other. The spring 44 ensures that the cartridge with the driven member 102 is firmly urged against the drive member 34.

As soon as this has been accomplished, the operator grasps the stand 76 by the left hand and then engages the handle 42 with the other hand and rotates it either in a clockwise or counter-clockwise direction. At the same time, the operator places one of his eyes against the eye piece 64. Rotation of the handle 42 will cause rotation of the driven member 102 and the sprocket 97 secured thereto. Rotation of the sprocket 97 will cause the film to be advanced frame by frame in a sequential manner independent of which way the sprocket 97 is rotated. When the sprocket is rotated in a clockwise direction as viewed in FIG. 12, the bottom of the length of film will be taken up. As this film is taken up, it will gradually urge the lower roller 121 away from the index plate 107 against the force of the spring 126. This continues until the film has been moved far enough away from the lower index pin 111 so that it will be released by both of the index pins 111. As soon as this occurs, the film 96 will be advanced until the next perforations 98 are in registration with the pins 111 and snap onto the pins by the force of the rollers 121. In this manner, the film is advanced by one frame. This frame remains stationary until the tape up of the film again causes release of the film from the index pins 111 to cause the next frame to be advanced. Assuming rotation of the sprocket 97 in a clockwise direction as viewed in FIG. 16 during the time that the frames of the film are periodically advanced, the upper run of the film is continuously being advanced towards the index plate. Also, during the time that this is occurring, the film is continuously being taken up. At all times the film 96 is kept under control. There is no difficulty in operating the crank in either direction to cause the film to be advanced in either direction across the aperture. The operation hereinbefore described is merely reversed.

During the time that film is being advanced in the viewer, ambient light is supplied to the back side of the film immediately adjacent the aperture so that sufficient illumination is provided to view the film. This light comes through the diffuser window 49 and then is bent through 90° to the film aperture. The operator, by utilizing the eye piece and by utilizing a relatively steady motion to operate the crank 42, can readily provide very good motion pictures.

It has been found that the motion picture viewer is particularly useful for short lengths of film which can be utilized for depicting certain specialized features. For example, such motion picture viewer can be readily utilized for the teaching of sports such as baseball, golf and tennis. The operator, by merely reversing the direction of rotation of the crank, can repeat any portion of the sequence as much as possible. The eye piece assembly is constructed so that it can be readily adjusted to focus the same. The cartridge can be readily removed and another cartridge put in its place. Thus, each cartridge can contain film depicting only one aspect of a sport, i.e., how to bunt in baseball.

The operation of the viewer is relatively quiet so it does not disturb the operator during the time he is operating the same. The viewer is relatively compact so that it can be held in one hand and operated by the other hand. In addition, it is constructed in such a manner that it can be constructed of relatively inexpensive parts.

We claim:

1. In a motion picture apparatus, a housing, a cartridge removably mounted in said housing, said cartridge being formed with an aperture, a length of film disposed in the cartridge, means for advancing said length of film frame by frame past the aperture in the cartridge, said housing having a diffuser window for admitting light therethrough, a member mounted in the cartridge and adapted to be exposed to the light for supplying light to the film on the side of the film opposite the aperture, and an optical assembly mounted in the housing in the front of the aperture in the cartridge for forming an image of the film as it is advanced in the cartridge.

2. A viewer as in claim 1 in which at least a portion of the cartridge is substantially transparent to permit the light to pass therethrough to said member.

3. In a motion picture apparatus, a housing, a cartridge removably mounted in said housing, said cartridge being formed with an aperture, a length of film disposed in the cartridge, means for advancing said length of film frame by frame past the aperture in the cartridge, said means for advancing the film being formed so that the film can be advanced in either of two directions, means mounted in the cartridge and adapted to be exposed to light for supplying light to the film on the side of the film opposite the aperture, and an optical assembly mounted in the housing in the front of the aperture in the cartridge to form an image of the film as it is advanced in the cartridge, said means for advancing the film including a driven sprocket forming the sole driven sprocket engaging the film, a driven member mounted on the cartridge and having a driving relationship with respect to the driven sprocket, the sole function of said driven member being to drive said driven sprocket, a drive member carried by the housing and adapted to engage the driven member when the cartridge is in the housing to drive the same, and crank means mounted on the housing and connected to the drive member for rotating the drive member.

4. A motion picture viewer as in claim 3 together with spring means mounted in the housing for urging the drive member and driven member into engagement with each other when the cartridge is in the housing.

5. In a motion picture apparatus, a housing, a cartridge removably mounted in said housing, said cartridge being formed with an aperture, a length of film disposed in the cartridge, means for advancing said length of film frame by frame past the aperture in the cartridge comprising upper and lower guide film members, said guide members having arcuate portions disposed on opposite sides of said sprocket and serving to retain said film in engagement with the said sprocket, upper and lower film rollers within the cartridge disposed adjacent the aperture in the cartridge and above and below the aperture in the cartridge, and yieldable spring means mounted in the cartridge for urging said rollers in a direction to move the film into close proximity with the aperture, means mounted in the cartridge and exposed to light for supplying light to the film on the side of the film opposite the aperture, and an optical assembly mounted in the housing in the front of the aperture in the cartridge to cause formation of an image of the film in the optical assembly as the film is advancing in the cartridge.

6. A viewer as in claim 3 wherein said cartridge is provided with an index plate and in which the aperture in the cartridge is in the index plate, and wherein a pair of index pins are mounted on said index plate above and below the aperture and are adapted to be engaged by the perforations in the film on one side of the film.

7. A viewer as in claim 3 wherein said cartridge has a continuous loop of film therein with upper and lower runs, and means within said cartridge for forming a roll of said film whereby film can be payed off from either the inside or the outside of said roll.

8. In a motion picture apparatus, a housing, a cartridge removably mounted in said housing, said cartridge being formed with an aperture, a length of film disposed in the cartridge, means for advancing said length of film frame by frame past the aperture in the cartridge, means mounted in the cartridge and exposed to light for supplying light to the film on the side of the film opposite the aperture, and an optical assembly mounted in the housing in the front of the aperture in the cartridge to form an image of the film as it is advanced in the cartridge, said cartridge having a continuous loop of film therein with upper and lower runs, a single sprocket engaging both said upper and lower runs, means within said cartridge for forming a roll of said film whereby film can be payed off from either the inside or the outside of said roll, said cartridge including a box-like framework and a cover for said box-like framework and wherein said means within said cartridge for forming a roll of said film includes a generally circular guide member carried by said box-like framework, a cylindrical member mounted on said cover, a generally J-shaped guide member mounted on said cover and having one extremity of the same terminating in a region which is generally tangential to said cylinder, and an additional guide member mounted on said cover and having one portion thereof which is adjacent said J-shaped member and another portion thereof which is adjacent said cylinder to form a slot for the travel of said film, said J-shaped member forming in cooperation with said circular guide member in said box-like framework a slot for the travel of said film.

9. A removable cartridge for use in a motion picture apparatus of the type having a housing for receiving the cartridge, driving means for the cartridge and an optical assembly for forming an image, said cartridge comprising means forming a framework having an index plate, said index plate having an aperture therein substantially in alignment with the eye piece assembly when the cartridge is disposed in the housing, said index plate having a pair of index pins spaced from each other on opposite sides of the aperture, a continuous loop of perforated film having upper and lower runs, guide means for guiding said film along said index plate past said aperture between said upper and lower runs, means within the cartridge for receiving light and for supplying light to the film on the side of the film opposite the aperture whereby said film is illuminated and an image formed in the optical assembly, a single sprocket rotatably mounted in the cartridge for rotation in either of two directions and adapted to be driven by the driving means, said sprocket engaging both said upper and lower runs and being the sole driven sprocket engaging said upper and lower runs, and means within said cartridge for forming a roll of said film enabling the film to be payed off from or taken up on either the inside or the outside of said roll, said pins being disposed in the directions of travel of the film and adapted to engage the perforations in the film.

10. A cartridge for retaining a continuous loop of perforated film for display in apparatus of the type having a housing for receiving the cartridge, driving means for the cartridge and an optical assembly, said cartridge comprising means forming a framework having an index plate, said index plate having an aperture substantially in alignment with the optical assembly when said cartridge is received in the housing, guide means for forming the film into upper and lower runs, additional guide means for guiding the film along said index plate past said aperture between the upper and lower runs, said index plate having a pair of index pins spaced from each other on opposite sides of the aperture for engaging the perforations in the film, means for receiving and supplying light to the side of the film opposite the aperture whereby the film is illuminated and an image is formed by the optical assembly, a single sprocket engaging both the upper and lower runs and adapted to be rotated in either of two different directions by the driving means when said cartridge is received in the housing, and means within the cartridge for forming a roll of the film whereby film can be payed off from or taken up on either the inside or the outside of the roll.

11. In a motion picture apparatus, a housing having an opening in the rear thereof, a cartridge adapted to be removably mounted in said housing by insertion through the opening, said cartridge being formed with an aperture, a length of film disposed in the cartridge, said cartridge including driven means for advancing said length of film past the aperture, said housing having driving means, and spring means mounted in said housing for yieldably engaging said cartridge to retain it in the housing and yieldably urging said driven means into engagement with said driving means when said cartridge is inserted into the opening.

12. A cartridge for use in a motion picture apparatus of the type having a housing for receiving the cartridge, reversible driving means for the cartridge and an optical assembly, said cartridge comprising means forming a framework having an index plate, said index plate having an aperture substantially in alignment with the optical assembly when the cartridge is disposed in the housing, a length of perforated film in said cartridge having upper and lower runs and having perforations on at least one side, guide means for guiding said film along said index plate past said aperture between said upper and lower runs, said index plate having a pair of index pins spaced from each other along the index plate in the direction of film travel and adapted to engage the perforations, a pair of film engaging members mounted in spaced relationship with respect to each other along the direction of film travel and adjacent said index pins, spring means engaging said film engaging members for yieldably urging said members and said film against said index plate whereby said index pins engage the perforations in the film so that said film is selectively advanced on a frame by frame basis past the aperture in either of two directions in response to the reversible driving means for the cartridge.

13. A cartridge for use in a motion picture apparatus of the type having a housing for receiving the cartridge, driving means for the cartridge and an optical assembly, said cartridge comprising means forming a framework having an index plate, said index plate having an aperture therein substantially in alignment with the optical assembly when the cartridge is disposed in the housing, a continuous loop of perforated film having upper and lower runs, guide means for guiding said film along said index plate past said aperture between said upper and lower runs, means within the cartridge for supplying light to the film on the side of the film opposite the aperture whereby said film is illuminated and an image formed in the optical assembly, a single sprocket engaging both said upper and lower runs and adapted to be driven by the driving means and means within said cartridge for forming a roll of film, said means for forming a roll of film being formed so that the film can be payed off from or taken up on either the inside or the outside of said roll, said means forming a roll of said film comprising a generally circular film storage guide exterior to said roll of film, a generally circular spool interior to said roll of film, a first guide member forming with said circular film storage guide an elongated slot extending generally between said sprocket and the outside of said roll of film for guiding said upper run of film onto or off of the outside of said roll of film, a second guide member forming with said first guide member a second elongated slot extending generally between said sprocket and the inside of said roll of film adjacent said circular spool for guiding said lower run of film onto or off of the inside of said roll of film.

14. A cartridge for retaining a continuous loop of perforated film for display in apparatus of the type having a housing for receiving the cartridge, driving means for the cartridge and an optical assembly, said cartridge comprising means forming a framework having an index plate, said index plate having an aperture substantially in alignment with the optical assembly when said cartridge is received in the housing, guide means for forming the film into upper and lower runs, additional guide means for guiding the film along said index plate past said aperture between the upper and lower runs, means for supplying light to the side of the film opposite the aperture whereby the film is illuminated and an image formed in the optical assembly, a single sprocket engaging both the upper and lower runs and adapted to be rotated in either of two different directions by the driving means and means within the cartridge for forming a roll of the film whereby the film can be payed off from or taken up on either the inside or the outside of the roll, said means for forming a roll of film comprising a generally circular film storage guide exterior to the roll of film, a generally circular spool interior to the roll of film, a first guide member forming with said circular film storage guide an elongated slot extending generally between said sprocket and the outside of the roll of film for guiding the upper run of film onto or off of the outside of said roll of film and a second guide member forming with said first guide member a second elongated slot extending generally between said sprocket and the inside of the roll of film adjacent said circular spool for guiding the lower run of film onto or off of the inside of the roll of film.

* * * * *